United States Patent [19]

Gray et al.

[11] Patent Number: 5,151,855

[45] Date of Patent: Sep. 29, 1992

[54] MULTIPLE MICROPROCESSOR SINGLE POWER SUPPLY SYSTEM SHUTDOWN

[75] Inventors: Charles A. Gray, Rochester; Rimas S. Milunas, Royal Oak; Larry T. Nitz, Troy, all of Mich.

[73] Assignee: Saturn Corporation, Troy, Mich.

[21] Appl. No.: 423,918

[22] Filed: Oct. 19, 1989

[51] Int. Cl.[5] .............................................. G06F 1/30
[52] U.S. Cl. .................... 395/750; 364/273; 364/273.4; 364/948.5; 364/948.9; 364/DIG. 1; 371/14; 371/66
[58] Field of Search .......... 364/200, 273, 273.4, 364/273.5, 900, 948.4, 948.5, 948.9; 365/226, 227, 228, 229; 371/66, 14; 307/9.1, 10.1, 10.7

[56] References Cited

U.S. PATENT DOCUMENTS

| | | | |
|---|---|---|---|
| 3,167,685 | 1/1965 | Bade et al. | 371/66 |
| 3,757,302 | 9/1973 | Pollitt | 371/14 |
| 4,422,163 | 12/1983 | Oldenkamp | 365/229 |
| 4,433,390 | 2/1984 | Carp et al. | 364/900 |
| 4,458,307 | 7/1984 | McAnlis et al. | 364/200 |
| 4,461,003 | 7/1984 | Tamhki | 371/14 |
| 4,580,222 | 4/1986 | Fujii | 371/66 |
| 4,611,289 | 9/1986 | Coppola | 371/66 |
| 4,635,195 | 1/1987 | Jeppesen, III et al. | 364/200 |
| 4,686,386 | 8/1987 | Tadao | 307/269 |
| 4,698,748 | 10/1987 | Juzswik et al. | 364/200 |
| 4,715,016 | 12/1987 | Lamiaux et al. | 365/229 |
| 4,742,482 | 5/1988 | Inskeep et al. | 364/900 |
| 4,744,097 | 5/1988 | Haruhara | 371/66 |
| 4,745,542 | 5/1988 | Baba et al. | 371/14 |
| 4,763,333 | 8/1988 | Byrd | 364/200 X |
| 4,787,040 | 11/1988 | Ames et al. | 364/424.01 |
| 4,839,530 | 6/1989 | Greenwood | 307/10.1 |
| 4,841,474 | 6/1989 | Zandveld et al. | 371/66 |
| 4,868,832 | 9/1989 | Marrington et al. | 364/200 X |
| 4,888,728 | 12/1989 | Shirakawa et al. | 371/14 X |
| 4,907,150 | 3/1990 | Arroyo et al. | 371/14 X |
| 4,922,456 | 5/1990 | Naddor et al. | 371/66 X |
| 4,965,828 | 10/1990 | Ergott, Jr. et al. | 371/14 X |

Primary Examiner—Michael R. Fleming
Assistant Examiner—Glenn A. Auve
Attorney, Agent, or Firm—Howard N. Conkey

[57] ABSTRACT

A power shutdown sequence provides for an orderly power shutdown for master and slave processors sharing a single power supply while at the same time allowing the master and slave processors to retain all the information learned regardless of failures. If the master senses a shutdown condition, it sends the slaves a power down signal confirming its intention to power down the system and commanding the slaves to initiate shutdown procedures, including the storing of variables to memory. In addition, the master also initiates shutdown procedures, and after a minimum time determined sufficient to allow the slave to complete their shutdown procedures, the master powers down the system. The slaves may also initiate their own powerdown procedures if a failure in the communications link with the master is sensed.

2 Claims, 4 Drawing Sheets

MULTIPLE MICROPROCESSOR SINGLE POWER SUPPLY SYSTEM SHUTDOWN

BACKGROUND OF THE INVENTION

This invention relates to a power shutdown sequence for a multiple microprocessor system sharing a single power supply and more particularly to an orderly power shutdown sequence for multiple microprocessor, single power supply control systems in automotive applications during the ignition cycle.

Currently, in powering down a control system such as an automotive vehicle control system having multiple microprocessors that share a single power supply, only one microprocessor, commonly referred to as the "master," is in control of the power supply. The remaining microprocessors, commonly referred to as the "slaves," have no control over the power supply. Consequently, when multiple microprocessors are powered by a single supply, the slave microprocessors have no means by which to powerdown while at the same time retaining all of the information learned during the operating cycle.

SUMMARY OF THE INVENTION

This invention provides a solution to currently existing powerdown problems for multiple microprocessor, single power supply control systems by means of a shutdown routine which allows the master and the slaves to powerdown in an orderly fashion in response to a shutdown condition while at the same time retaining all of the information learned during the operating cycle, regardless of any failures.

In the powerdown routine of the current system, if the master senses a shutdown condition such as represented by a drop in the automotive vehicle engine ignition voltage, it sends the slaves a powerdown signal via a serial communications link confirming its intention to powerdown the system and commanding the slaves to initiate shutdown procedures, including the storing of variables to memory. At the same time, the master also initiates shutdown procedures. After a minimum time determined to be sufficient to allow the slaves to complete their shutdown chores, the master powers down the system including shutting down the common power supply.

In another feature of this invention, each of the slaves also senses the shutdown condition via an analog-to-digital converter and initiates shutdown chores if the shutdown condition is sensed for a predetermined period if it also determines if the communications link between the master and slave is not operational. In this manner, the present invention accounts for the possibility of a failure in the communications link between the master and the slaves.

In yet another feature of this invention, if the slave has lost the capability of accurately sensing the shutdown condition due to a failure of its analog-to-digital converter, communication with the master provides the only reliable powerdown information and a slave powerdown is initiated only in response to a command for such from the master. In this case, powerdown by the slave in response to its own monitoring of the shutdown condition is prevented.

In another feature of this invention, if a slave senses a failure in both the serial communications link with the master and in its analog-to-digital converter, the execution of the slave shutdown procedures are bypassed. In this way, the slave avoids a disruption while storing to memory that may occur if the master powers down the system while the slave is storing to memory.

In the description of the preferred embodiment of the invention, the master microprocessor controls the functions of an automotive vehicle engine and the slave microprocessors control the vehicle transmission functions.

The invention may be best understood by reference to the following description of a preferred embodiment and the drawings in which.

DESCRIPTION OF THE PREFERRED EMBODIMENT

Figure 1:
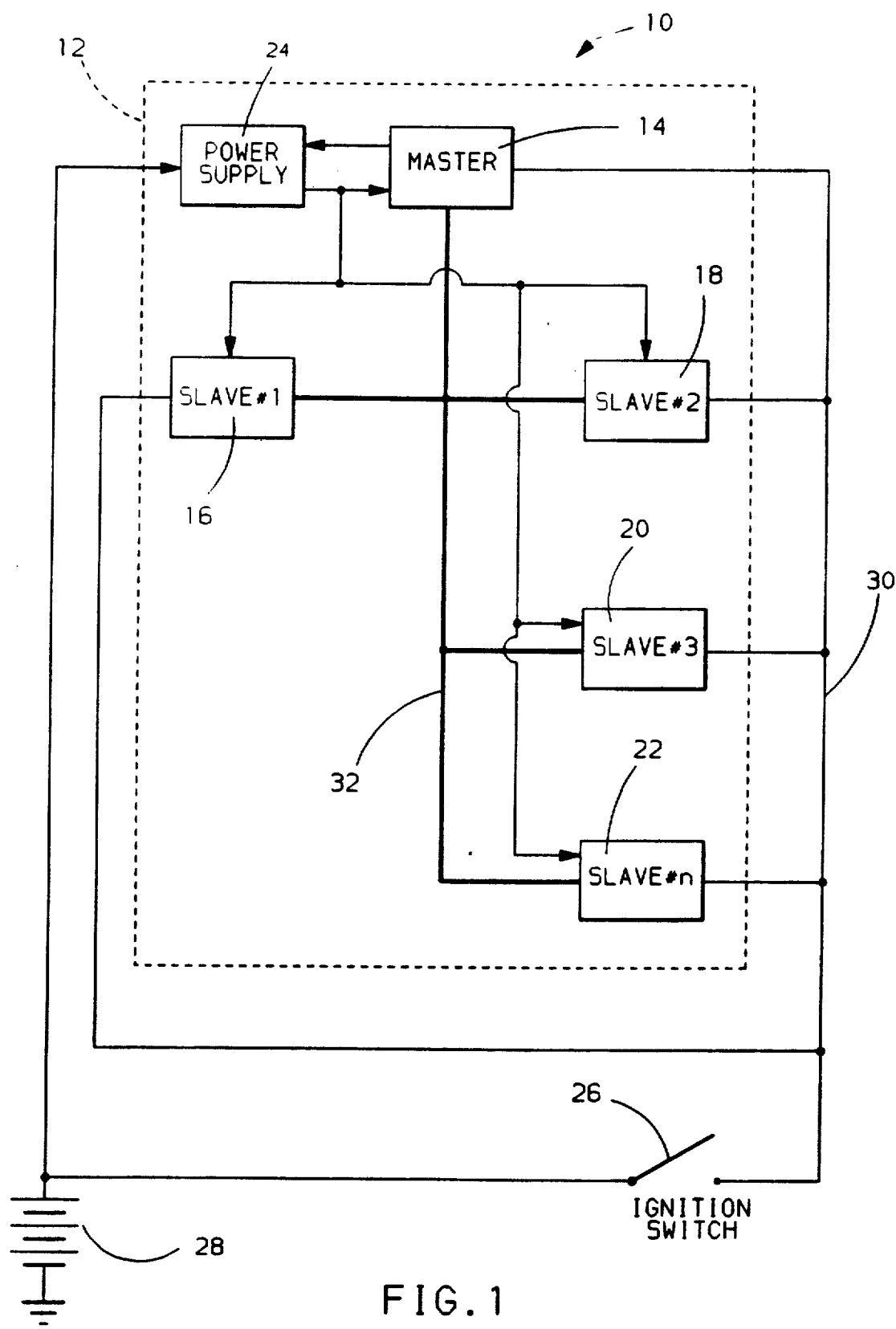
FIG. 1 is a schematic and block diagram of a control system configuration containing multiple microprocessors (master and slaves) sharing a single power supply.

Referring to FIG. 1, an automotive vehicle control system configuration 10 is shown. The control system configuration 10 includes an embedded multiple microprocessor control system 12 containing a master microprocessor 14 controlling vehicle engine functions, slave microprocessors 16 through 22 controlling vehicle functions such as transmissions functions, etc., and a single shared power supply 24 providing operating voltage for each of the master and slave microprocessors 14–22. The master 14 and each of the slaves 16 through 22 share the single power supply 24 and communicate via an internal serial peripheral interface communications bus 32. The power supply 24 receives its operating voltage from a vehicle battery 28.

The control system configuration 10 shown in FIG. 1 is operative to control the particular control functions while ignition voltage is provided to the various vehicle systems via a conventional ignition switch 26 that is selectively closed by the vehicle operator. When the ignition switch 26 is closed by the operator, voltage from the motor vehicle battery 28 provides an ignition voltage signal on line 30 that is transmitted to the master 14 and each of the slaves 16 through 22. The master 14 and the slaves 16–22 each have an analog-to-digital (A/D) converter that monitors the level of this ignition voltage signal. As will be described, this ignition voltage signal represents a power shutdown condition when its value is low (below a predetermined value) which will occur, for example, when the vehicle operator opens the ignition switch 26 to shut off the vehicle engine.

Figure 2:
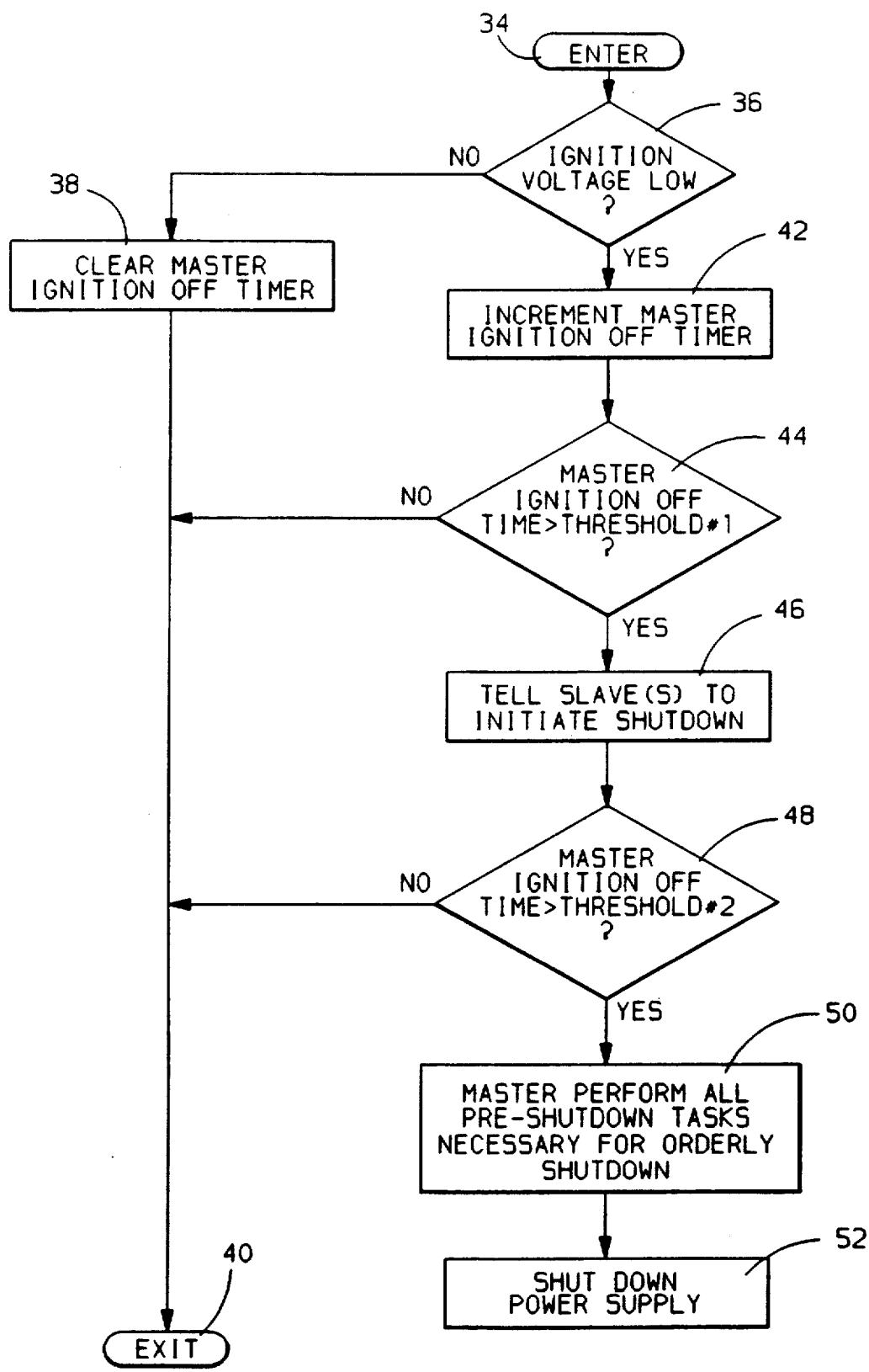
FIG. 2 is a flow chart for the master shutdown routine of the control system configuration of FIG. 1.
Figure 3A:
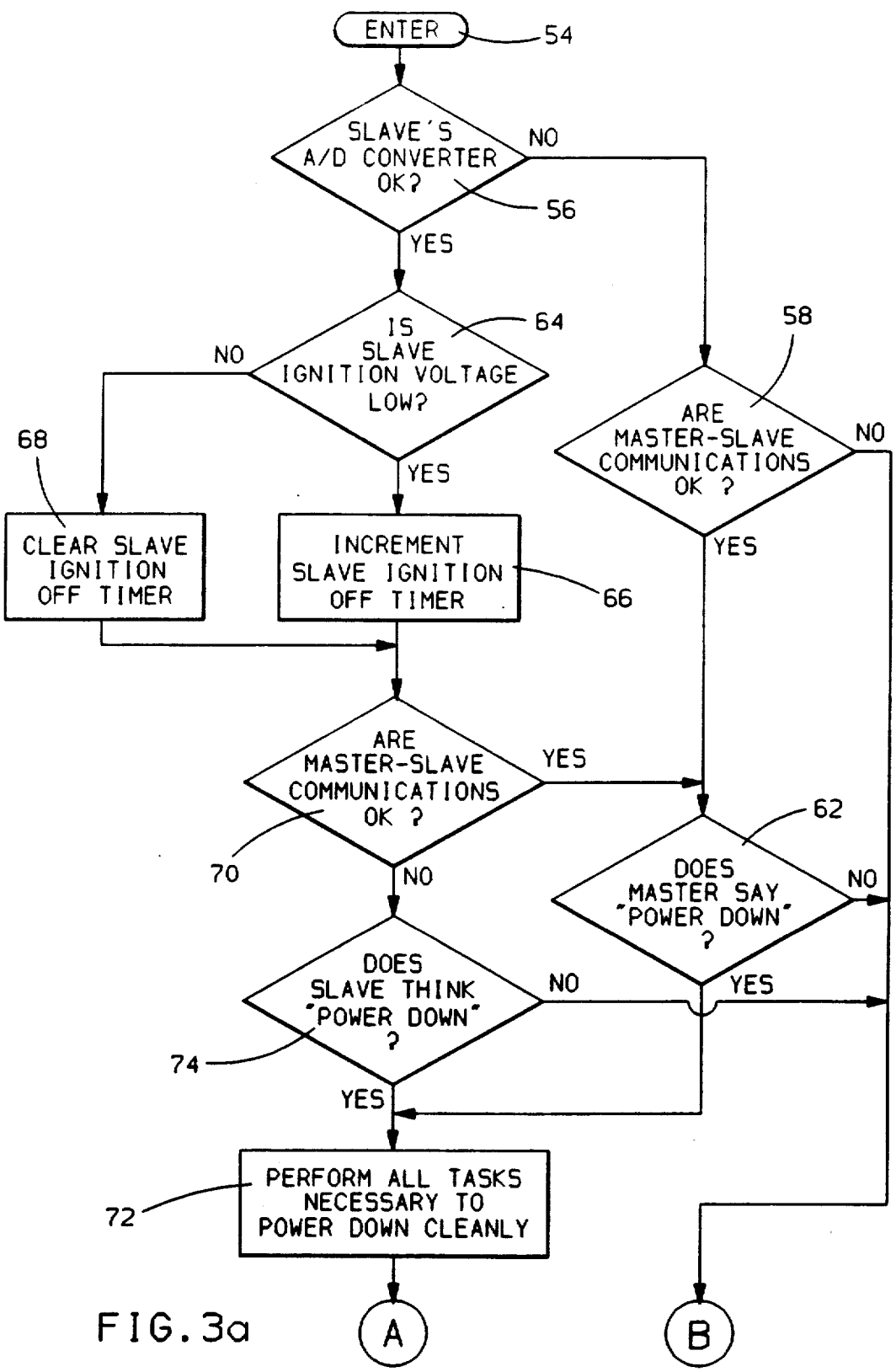
FIGS. 3A and 3B are a flow chart for the slave shutdown routine of the control system configuration of FIG. 1.
Figure 3B:
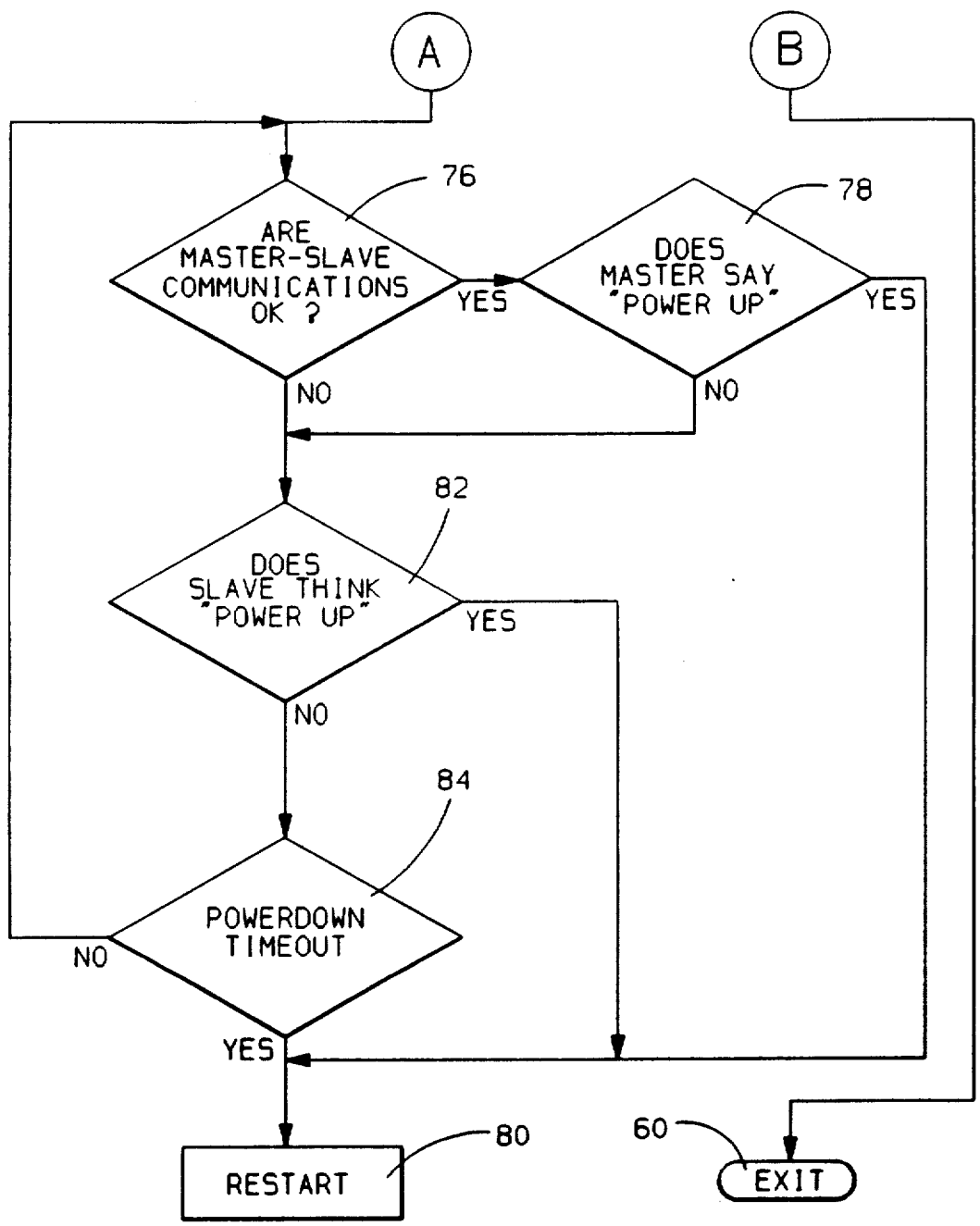

The master and slave microprocessors each operate in accord with program routines stored in their respective memories. FIG. 2 illustrates the powerdown routine stored in the master microprocessor 14 and FIGS. 3A and 3B illustrate the powerdown routine stored in memory in each slave microprocessor 16–22.

Referring to FIG. 2 the master powerdown routine is illustrated. This routine is continuously repeated at predetermined intervals such as 100 msec intervals. The program is entered at step 34 and then proceeds to step 36 where the ignition voltage signal level is compared to a calibration reference below which a powerdown condition exists assuming certain time constraints are met. If the ignition voltage signal is high indicating the ignition switch 26 is closed and a shutdown condition is not present, a master ignition off timer is cleared at step 38 after which the routine is exited at step 40.

If step 36 determines that the ignition voltage is low representing a shutdown condition, the master ignition off timer is incremented at step 42. Since this timer is cleared while the ignition voltage signal is high, its count represents the elapsed time of the shutdown condition. At the next step 44, this elapsed time is sampled and compared with a calibration time #1 representing a "wait" time before the master initiates system shutdown procedures by commanding the slave microprocessors 16–22 to execute their shutdown procedures including the storage of variables to memory. The wait time is provided to prevent noise in the ignition signal from initiating an invalid shutdown.

If the time #1 has not expired, the program executes the routine at step 40. However, if the time #1 has expired, the master commands the slave microprocessors 16–22 to begin their shutdown procedures at step 46. The slave shutdown procedure requires a period of time to complete. During this time, if the power supply 24 were shut down by the master microprocessor 14, interruption of the slave shutdown procedures would occur. To prevent this condition from occurring, the master delays shutting down the power supply 24 until the expiration of a slave shutdown time period after commanding the slaves to execute their shutdown procedures. This slave shutdown time period is a predetermined constant time period t (such as 3.5 seconds) that allows the slave microprocessors to complete their shutdown tasks.

In this embodiment, the master 14 divides the slave shutdown time period t into two segments, one equal to the time the master determines is required to perform its own shutdown tasks and the other equal to the remaining portion of the slave shutdown time period. After the slaves are commanded to initiate their shutdown procedures, the master first times the latter segment (hereinafter referred to as the first segment) and then performs its own shutdown tasks whose duration equals the final or second segment. At the time the master 14 completes its shutdown tasks, the total slave shutdown time period t expires after which shutdown of the power supply may be performed.

Timing of the first segment of the slave shutdown time period is accomplished at step 46 by determining a master ignition off timer value #2 established by step 42 at the expiration of the first segment. In other words, the ignition off timer value #2 is established so that the difference between the ignition off timer value #2 and the ignition off timer value #1 is equal the the first segment of the slave shutdown time period. For example, if the slave shutdown time period t is 3.5 seconds and the master determines its shutdown tasks will consume 0.5 seconds, the shutdown timer value #2 is set to a value representing the sum of the time represented by the shutdown timer value #1 plus 3 seconds.

Step 48 determines the master ignition off timer value #2 in accord with the above conditions and then determines if the master ignition off timer has been incremented to this value. if not, the program exits the routine at step 40. However, if step 48 determines that the first segment of the slave shutdown time period has expired as represented by the master ignition off timer value exceeding the value #2, the master 14 then performs its own shutdown tasks at step 50 which consumes the remaining time of the slave shutdown time period. Thereafter, the system is powered down at step 52 by shutting off the power supply 24. In one embodiment, step 52 may take the form of an infinite loop that causes a reset which (with the ignition switch 26 off) shuts down the power supply 24.

The foregoing routine provides for the master 14 controlling the shutdown of the system in response to a low ignition voltage signal in a manner that assures that all of the slaves complete their shutdown tasks before the system is powered down.

Referring now to FIG. 3, the powerdown algorithm executed by each slave microprocessor 16–22 is illustrated. The program is continuously repeated at predetermined intervals such as 50 msec intervals.

The program is entered at step 54 and then determines at step 56 if its A/D converter is operating properly. Since the A/D converter is used to measure the value of the ignition voltage signal, this step determines if a reliable measurement of this signal is available. Various parameters may be used to determine a failure in the slave A/D converter. For example, improper operation may be indicated if the analog to digital conversion time is greater than a predetermined maximum conversion time, if the conversion time is less than a minimum conversion time or if the reference voltage in the A/D converter is out of range.

If the analog-to-digital converter of the slave has failed, the program proceeds to decision block 58 to determine whether the master 14 and the slave are communicating properly via the serial peripheral interface bus 32 of FIG. 1. Various parameters may be used to determine a failure in the communications link with the master microprocessor 14. For example, a failure may be indicated if messages are received from the master microprocessor 14 at a rate less than a predetermined rate, if messages are received at a rate greater than a higher rate indicating noise on the communications link 32 or if the data received is bad as represented by a checksum.

If step 58 determines that the serial link 32 has failed, the slave cannot determine the ignition voltage value due to a failure of its A/D converter (determined at step 56) and cannot "hear" a master shutdown command due to the failure in the communications link between the master 14 and the slave. When this condition exists, the program exits at step 60. It will be noted that this bypasses any shutdown procedure in the slave since it is not possible for the slave to know when a shutdown condition will occur.

If the slave determines at step 58 that the serial communications link 32 has not failed, the program proceeds to decision block 62 to determine if the master is commanding the slave to execute its shutdown tasks. If the master is not commanding the slave to execute its shutdown tasks, the program exits at step 60. However, if the master is commanding the slave to execute its shutdown tasks, the program proceeds to step 72 where the slave performs all of the shutdown procedures including the storage of variables to memory.

If the slave's A/D converter is functioning properly, the routine of FIG. 2 provides for the slave itself initiating its own shutdown procedures if it determines that the communications link with the master has failed. In this case, the slave monitors the ignition voltage signal in the same manner as the master and then simulates the master's shut down command if the ignition voltage signal is low for a predetermined period of time (which may be the time #1 of step 44 in the master shutdown routine of FIG. 2). If step 56 determines that the slave A/D converter is functioning properly, steps 64, 66 and 68 are executed to time the period that the ignition voltage signal as measured by the A/D converter is low. This is accomplished by incrementing a slave ignition off timer at step 66 if step 64 determines that the ignition voltage signal is low and clearing the ignition off timer at step 68 if step 64 determines that the ignition voltage signal is greater that the low value.

The program next determines if the communications link with the master is operational in the same manner as described above with respect to step 58. If the communications link has not failed, the program proceeds to the step 62 and the slave executes its shutdown procedures only in response to a command from the master microprocessor 14 via steps 62 and 72 as described above. However, if step 70 determines that the communications link with the master has failed, the program executes step 74 which determines if the slave ignition off timer represents a low voltage for the predetermined time period. If the predetermined time period has not lapsed, the program exits at step 60. However, if step 74 determines that the ignition off timer represents that the ignition voltage has been low for the predetermined period, the program proceeds to step 72 and executes the slave shutdown tasks.

After the powerdown procedures are performed at step 72, the slave microprocessor enters a wait loop at decision block 76 during which the execution of the above described steps at the 50 msec interval is inhibited. Initially, at decision block 76, the program will determine whether the communications link 32 with the master has failed. If the master-slave communications are functioning properly, the program proceeds to decision block 78 where the slave determines if the master microprocessor 14 is commanding a powerup. If the master is commanding a powerup, the slave will restart execution of its normal program at step 80.

If the slave determines that the master 14 is not commanding a powerup at step 78 or if step 76 determines that the communications link with the master is not operating satisfactorily, the program proceeds to decision block 82 to determine if the slave should initiate powerup based on the level of the ignition voltage signal. If step 82 determines that the ignition voltage signal has returned to a high state, step 80 is executed to initiate powerup of the slave. However, if a powerup condition does not exist based on the level of the ignition voltage signal, the program proceeds to decision block 84 where the slave determines if a predetermined powerdown timeout period has expired. If the predetermined powerdown timeout period has expired, the program restarts at step 80. If the powerdown timeout has not expired, the program will repeat the foregoing steps until (1) the master 14 commands a powerup or (2) the slave detects a high value of the ignition voltage signal at step 82 or (3) the powerdown timeout has expired. Any one of these conditions will result in a restart at step 80.

In summary, the powerdown system provides for an orderly shutdown of the slave processor(s) 16-22 in all four state failure combinations of the communications link between the master 14 and slaves 16-22 and the A/D converter in each of the slaves as follows. In the normal case where the communications link and the slave A/D converter are both operational, the slave maintains its ignition off timer as a backup to the master's shutdown command, and then decides whether to powerdown or not solely by the master's command at decision block 62.

In the case where the communications link is operational and the slave A/D converter has failed, the slave ignition off timer is not updated because the slave cannot accurately determine the value of the ignition voltage signal, but the decision to shut down or not is still made according to the master's command at decision block 62.

In the case where the communications link has failed and the slave's A/D converter is operational, the slave monitors the ignition voltage in the same manner as the master and then simulates the master's shut down command at decision block 74 according to its own ignition voltage off timer.

In the case where the communications link and the slave A/D converter have both failed, the slave cannot determine the ignition voltage and cannot "hear" the master's shutdown command. With no idea when the shut down will occur, the slave continues with normal control, and the logic path is from block 56 to block 58 to block 60.

In the foregoing description, it is noted that each slave is autonomous, and a failure in one slave does not mean the other slaves will be impacted. For example, one slave could be operating normally as in the first case above while another slave could be critically failed such as in the last case above.

The foregoing description of a preferred embodiment of the invention for the purpose of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. A power shutdown method for a system having a master microprocessor, a slave microprocessor having an analog-to-digital converter, and a single supply voltage source for the master and slave microprocessors, the master and the slave microprocessors communicating via a communication link therebetween, the method comprising the steps of:

sensing a power shutdown condition by the master microprocessor;

sending a shutdown command from the master microprocessor through the communication link to the slave microprocessor to initiate slave shutdown procedures including storing variables to memory when a shutdown condition is sensed by the master microprocessor;

powering down the system including the voltage source by the master microprocessor after a predetermined minimum time period after sending a shutdown command to the slave microprocessor, the minimum time period having a predetermined value that allows the slave microprocessor to complete the slave shutdown procedures;

sensing a failed condition of the communication link by the slave microprocessor;

sensing the power shutdown condition by the slave microprocessor analog-to-digital converter;

sensing a failed condition of the slave microprocessor analog-to-digital converter by the slave microprocessor;

executing shutdown procedures by the slave microprocessor (A) in response to a shutdown command received from the master microprocessor of (B) when the failed condition of the communication link is sensed by the slave microprocessor and the power shutdown condition is sensed by the slave microprocessor; and bypassing the shutdown procedures by the slave microprocessor when (A) the failed condition of the communication link is sensed by the slave microprocessor and (B) the failed condition of the analog-to-digital converter is sensed by the slave microprocessor.

2. A power shutdown method for a system having a master microprocessor, a slave microprocessor and a single supply voltage source for the master and slave microprocessors, the master and the slave microprocessors communicating via a communication link therebetween, the method comprising the steps of:

sensing a power shutdown condition by the master microprocessor;

sending a shutdown command from the master microprocessor through the communication link to the slave microprocessor to initiate slave shutdown procedures including storing variables to memory in response to a sensed power shutdown condition;

executing predetermined shutdown procedures by the slave microprocessor in response to the shutdown command received from the master microprocessor;

powering down the system including the voltage source by the master microprocessor after a predetermined minimum time period following the sending of the shutdown command that allows the slave microprocessor to execute its predetermined shutdown procedures;

sensing a failed condition of the communication link by the slave microprocessor;

sensing the power shutdown condition by the slave microprocessor; and executing shutdown procedures by the slave microprocessor when the failed condition is sensed and the power shutdown condition is sensed by the slave microprocessor.

* * * * *